(12) United States Patent
Nakamura et al.

(10) Patent No.: US 7,447,123 B2
(45) Date of Patent: Nov. 4, 2008

(54) OPTICAL PICKUP DEVICE

(75) Inventors: Kenji Nakamura, Saitama (JP); Shigeru Nakamura, Tokyo (JP)

(73) Assignee: Sanyo Electric Co., Ltd., Osaka (JP)

( * ) Notice: Subject to any disclaimer, the term of this patent is extended or adjusted under 35 U.S.C. 154(b) by 636 days.

(21) Appl. No.: 11/192,315

(22) Filed: Jul. 29, 2005

(65) Prior Publication Data
US 2006/0028932 A1    Feb. 9, 2006

(30) Foreign Application Priority Data

Aug. 9, 2004    (JP)    .............................. 2004-232344
Jan. 27, 2005   (JP)    .............................. 2005-019217

(51) Int. Cl.
*G11B 7/00*    (2006.01)

(52) U.S. Cl. ............................... 369/44.23; 369/112.01

(58) Field of Classification Search .............. 369/44.23, 369/112.01
See application file for complete search history.

(56) References Cited

U.S. PATENT DOCUMENTS

| | | | | |
|---|---|---|---|---|
| 4,709,139 | A * | 11/1987 | Nakamura et al. | 369/44.23 |
| 5,272,685 | A * | 12/1993 | Ando | 369/44.14 |
| 6,091,692 | A * | 7/2000 | Morimoto | 369/44.23 |
| 6,094,412 | A * | 7/2000 | Morimoto | 369/44.23 |
| 6,167,018 | A * | 12/2000 | Morimoto et al. | 369/44.23 |
| 6,816,450 | B2 * | 11/2004 | Miura et al. | 369/112.29 |
| 7,092,325 | B2 * | 8/2006 | Kim et al. | 369/44.37 |

FOREIGN PATENT DOCUMENTS

| | | |
|---|---|---|
| JP | 06-077332 | 3/1994 |
| JP | 11-296875 | 10/1999 |
| JP | 2000-276742 | 10/2000 |

* cited by examiner

*Primary Examiner*—Thang V Tran
(74) *Attorney, Agent, or Firm*—Fish & Richardson P.C.

(57) ABSTRACT

An optical pickup device comprising a plane-parallel plate beam splitter that reflects a laser beam emitted from a laser beam source, an objective lens that focuses the laser beam from the plane-parallel plate beam splitter so as to irradiate the focused beam into a signal recording medium, a photodetector that receives the laser beam reflected and returned from the signal recording medium through the beam splitter, the photodetector having light receiving regions each of which is divided at least into four parts by two dividing lines that intersect each other at right angle, a first plane-parallel plate disposed between the beam splitter and the photodetector, the first plane-parallel plate being tilted in the direction rotated $\pi/2$ radians around the optical axis with respect to the beam splitter, and a second plane-parallel plate disposed between the beam splitter and the photodetector, the second plane-parallel plate being tilted in the direction of rotation around the optic axis such that the direction of astigmatism projected on the light receiving regions of the photodetector has an angle of $\pi/4$ radians relative to each of the dividing lines, wherein astigmatism generated by the beam splitter is canceled by the first plane-parallel plate, and wherein astigmatism used for focus control is generated by the second plane-parallel plate.

3 Claims, 4 Drawing Sheets

__NUM__US 7,447,123 B2__NUM__

OPTICAL PICKUP DEVICE

CROSS-REFERENCE TO RELATED APPLICATIONS

The present application claims priority from Japanese Patent Applications No. 2004-232344 filed on Aug. 9, 2004 and Japanese Patent Application No. 2005-019217 filed on Jan. 27, 2005, which are herein incorporated by reference.

BACKGROUND OF THE INVENTION

1. Field of the Invention

The present invention relates to an optical pickup device employing, for focus control, the astigmatism method that includes causing a laser beam, emitted from a laser beam source, to be reflected by a plane-parallel plate beam splitter so as to guide the beam to an objective lens, causing the objective lens to focus the laser beam so as to irradiate the beam into a signal recording medium, causing the laser beam, reflected and returned from the signal recording medium, to transmit through the beam splitter so as to guide the beam to a photodetector, and imparting astigmatism to the laser beam received by the photodetector.

2. Description of the Related Art

An optical pickup device for optically recording/playing back a signal to/from a signal recording medium such as a CD or DVD optical disk using a laser beam employs one of the three-beam method, the push-pull method, and the phase difference method or an applied method thereof as the tracking control method adapted to cause a laser beam, irradiated into the signal recording medium, to follow a signal track on the signal recording medium to ensure compatibility with the standard system of the signal recording medium.

On the other hand, the astigmatism method is normally used for focus control that is intended to focus the laser beam, irradiated into the signal recording medium, to a signal surface of the signal recording medium.

For example, some optical pickup devices compatible with various types of recordable/playable CDs, DVD-ROMs and DVDs±R/RW employ, as a tracking control method, the phase difference method for DVD-ROMs and the differential push-pull method for DVDs±R/RW and CDs and, as a focus control method, the astigmatism method for various types of recordable/playable CDs and the differential astigmatism method for various types of recordable/playable DVDS.

The differential push-pull method, the differential astigmatism method and the three-beam method all require three beams. Therefore, the optical pickup device employing any one of the above methods uses a photodetector provided with a diffraction grating adapted to diffract and form a zero-order diffracted light beam and positive and negative first-order diffracted light beams, as universally known, so as to separate a laser beam emitted from a semiconductor laser into three beams, and light receiving regions respectively adapted to receive reflected light beams of the three beams reflected by the signal recording medium.

FIG. 2 illustrates an example of a light receiving surface of the photodetector compatible with the optical pickup device exemplified above, and the tracking control system and the focus control system will be described with reference to this figure.

Of the three beams irradiated into the signal recording medium, the main spot of the zero-order diffracted light beam is arranged at the center on the signal track, whereas the sub-spots of the positive and negative first-order diffracted light beams are each arranged at the center between the signal track with the main spot and either of the adjacent signal tracks in different directions from each other.

The light receiving surface of the photodetector has three light receiving regions arranged vertically one on top of the other, namely, a main light receiving region 21 and sub-light receiving regions 22 and 23, each made up of four segments as a result of cross-shaped division into four parts by two dividing lines that intersect each other at right angle. The main light receiving region 21 and the sub-light receiving regions 22 and 23 respectively receive the zero-order diffracted light beam and the positive and negative first-order diffracted light beams reflected by the signal recording medium. In this case, one of the dividing lines or dividing lines 21A, 22A and 23A of the main light receiving region 21 and the sub-light receiving regions 22 and 23 are provided in the direction of the signal tracks of the signal recording medium in consideration of the tracking control system used.

It is to be noted that, in FIG. 2, individual light reception outputs obtained from the individual segments making up the main light receiving region 21 and the sub-light receiving regions 22 and 23 are designated as 'a', 'b', 'c', 'd', 'e', 'f', 'g', 'h', 'i', 'j', 'k' and 'l', respectively.

The phase difference method employed for tracking control of DVD-ROM playback detects the phase difference between sum signals (a+c) and (b+d) obtained by adding the light reception outputs of the segments diagonal to each other in the main light receiving region 21 or the phase difference between the light reception outputs 'a' and 'd' or 'b' and 'c' of the given adjacent segments divided by a dividing line 21A of the main light receiving region 21 that runs in the direction of the signal tracks See, for example, Japanese Patent Application Laid-Open Publication No. 2000-276742.

The differential push-pull method employed for tracking control of DVD±R/RW recording and CD recording and playback calculates a main push-pull signal that is a difference signal between sum signals obtained by adding the light reception outputs of the two segments each divided by the dividing line 21A of the main light receiving region 21 that runs in the direction of the signal tracks, calculates first and second sub-push-pull signals that are respectively difference signals between sum signals obtained by adding the light reception outputs of the two segments each divided by the dividing line 22A and 23A of the sub-light receiving regions 22 and 23 that run in the direction of the signal tracks, adjusts a combined sub-push-pull signal, obtained by combining the first and second sub-push-pull signals, with a gain (G1) in conformity with the main push-pull signal, and calculates the difference between the main push-pull signal and the combined sub-push-pull signal to obtain a tracking error signal having the calculation formula "a−b−c+d−G1(e−f−g+h+i−j−k+l)" See, for example, Japanese Patent Application Laid-Open Publication No. 11-296875.

The astigmatism method employed for focus control of various types of recordable/playable CDs imparts astigmatism to the reflected light beams reflected by the signal recording medium such that astigmatism occurs at 45° angle relative to the dividing lines of the main light receiving region 21 and the sub-light receiving regions 22 and 23, adds the light reception outputs of the segments diagonal to each other in the main light receiving region 21 to obtain two sum signals, and calculates the difference between the two sum signals to obtain a focus error signal that is a main astigmatism signal having the calculation formula "a+c−(b+d)."

The differential astigmatism method employed for focus control of various types of recordable/playable DVDs, obtains a sub-astigmatism signal of each of the sub-light receiving regions 22 and 23 as with the main light receiving region 21 in the above astigmatism method, adjusts the sub-astigmatism signals of the sub-light receiving regions 22 and 23 with a gain (G2) in conformity with the main astigmatism signal, and adds the sub-astigmatism signals to the main astigmatism signal to obtain a focus error signal having the calculation formula "a+c−(b+d)+G2(e−f+g−h+i−j+k−l)" See, for example, Japanese Patent Application Laid-Open Publication No. 11-296875.

Incidentally, astigmatism required for the astigmatism or differential astigmatism method is generated by providing cylindrical, toric or toroidal anamorphic lenses with different focal distances in two directions perpendicular to the optical axis that intersect each other at right angle in the optical path guiding the reflected light beams reflected from the signal recording medium, or by providing a plane-parallel plate in tilted position relative to the plane perpendicular to the optical axis.

In an optical pickup device using a plane-parallel plate beam splitter to separate the laser beam source and the photodetector in different optical paths, the reflected light beams reflected from the signal recording medium transmit through the beam splitter to be guided into the photodetector as a result of providing the photodetector in the optical path of the beam splitter. Therefore, the beam splitter is used to generate and impart astigmatism for focus control to the light beams received by the photodetector.

A plane-parallel plate beam splitter is employed in a number of optical pickup devices for its higher potential for cost reduction as compared to a prism beam splitter.

Incidentally, when an optical pickup device employs the phase difference or push-pull method (including the differential push-pull method) for tracking control, one of the dividing lines must be provided in the direction of signal tracks in the light receiving regions of the photodetector (main- and sub-light receiving regions).

If dividing lines of the photodetector's light receiving regions must be provided in consideration of the signal track direction as described above, the direction of astigmatism generated by the plane-parallel plate beam splitter is often inappropriate relative to the dividing lines of the photodetector's light receiving regions and for the astigmatism method due to design restrictions such as the optical arrangement of the optical pickup device.

In such a case, a prism beam splitter is normally used, and a different optical element, adapted to generate astigmatism, is provided in the optical path leading to the photodetector.

Alternatively, an optical element is provided in the optical path leading to the photodetector to generate astigmatism after the cancellation of astigmatism generated by the plane-parallel plate beam splitter. See Japanese Patent Application Examined Publication (KOKOKU) No. 06-77332.

Incidentally, in the optical pickup device described in Japanese Patent Application Examined Publication (KOKOKU) No. 06-77332, a single lens is given the functions to cancel astigmatism generated by a plane-parallel plate beam splitter and to newly generate astigmatism. This lens has, on one side, an anisotropic curvature adapted to generate astigmatism in opposite direction so as to cancel astigmatism, and a toric or toroidal surface having an anisotropic axis on the other side.

This requires a lens with special functionality. In addition, the relationship is fixed between the direction of astigmatism adapted to cancel astigmatism generated by the plane-parallel plate beam splitter and that of astigmatism newly generated. Therefore, the directions of these astigmatisms cannot be adjusted. This makes it impossible to finely adjust the directions of astigmatisms to be generated in response to the photodetector.

SUMMARY OF THE INVENTION

An aspect of the present invention is an optical pickup device comprising a plane-parallel plate beam splitter that reflects a laser beam emitted from a laser beam source, an objective lens that focuses the laser beam from the plane-parallel plate beam splitter so as to irradiate the focused beam into a signal recording medium, a photodetector that receives the laser beam reflected and returned from the signal recording medium through the beam splitter, the photodetector having light receiving regions each of which is divided at least into four parts by two dividing lines that intersect each other at right angle, a first plane-parallel plate disposed between the beam splitter and the photodetector, the first plane-parallel plate being tilted in the direction rotated π/2 radians around the optical axis with respect to the beam splitter, and a second plane-parallel plate disposed between the beam splitter and the photodetector, the second plane parallel plate being tilted in the direction of rotation around the optical axis such that the direction of astigmatism projected on the light receiving regions of the photodetector has an angle of π/4 radians relative to each of the dividing lines, wherein astigmatism generated by the beam splitter is canceled by the first plane-parallel plate, and wherein astigmatism used for focus control is generated by the second plane-parallel plate.

Thus, two different plane-parallel plates are used, one to cancel astigmatism generated by the beam splitter and the other to generate astigmatism used for focus control. At the same time, astigmatism is generated independently, irrespective of astigmatism generated by the beam splitter.

The present invention uses the first plane-parallel plate as an optical element adapted to cancel astigmatism generated by the beam splitter, eliminating the need for a special and high-cost optical component and allowing-adjustment of the intensity of astigmatism to be canceled based on the material, thickness and tilt angle of the first plane-parallel plate.

The second plane-parallel plate can be independently provided between the beam splitter and the photodetector to generate astigmatism used for focus control, irrespective of astigmatism generated by the beam splitter. The second plane-parallel plate can be configured with sheet glass, offering cost advantage and versatility.

The second plane-parallel plate is tilted in the direction rotated π/4 radians around the optical axis respectively relative to the tilt directions of the beam splitter and the first plane-parallel plate. This allows comatic aberration generated by the second plane-parallel plate to act so as to cancel combined comatic aberration generated by the beam splitter and the first plane-parallel plate. As a result, comatic aberration generated by the beam splitter and the first plane-parallel plate can be corrected by the second plane-parallel plate.

One of the dividing lines of the light receiving regions can be set in the direction of the signal tracks of the signal recording medium without considering the direction of astigmatism generated by the beam splitter so as to ensure compatibility with optical pickup devices employing the phase difference or push-pull method as the tracking control system. This ensures a high degree of freedom in optical design in terms of the orientation of the laser beam incident upon a reflect mirror.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

Figure 1:
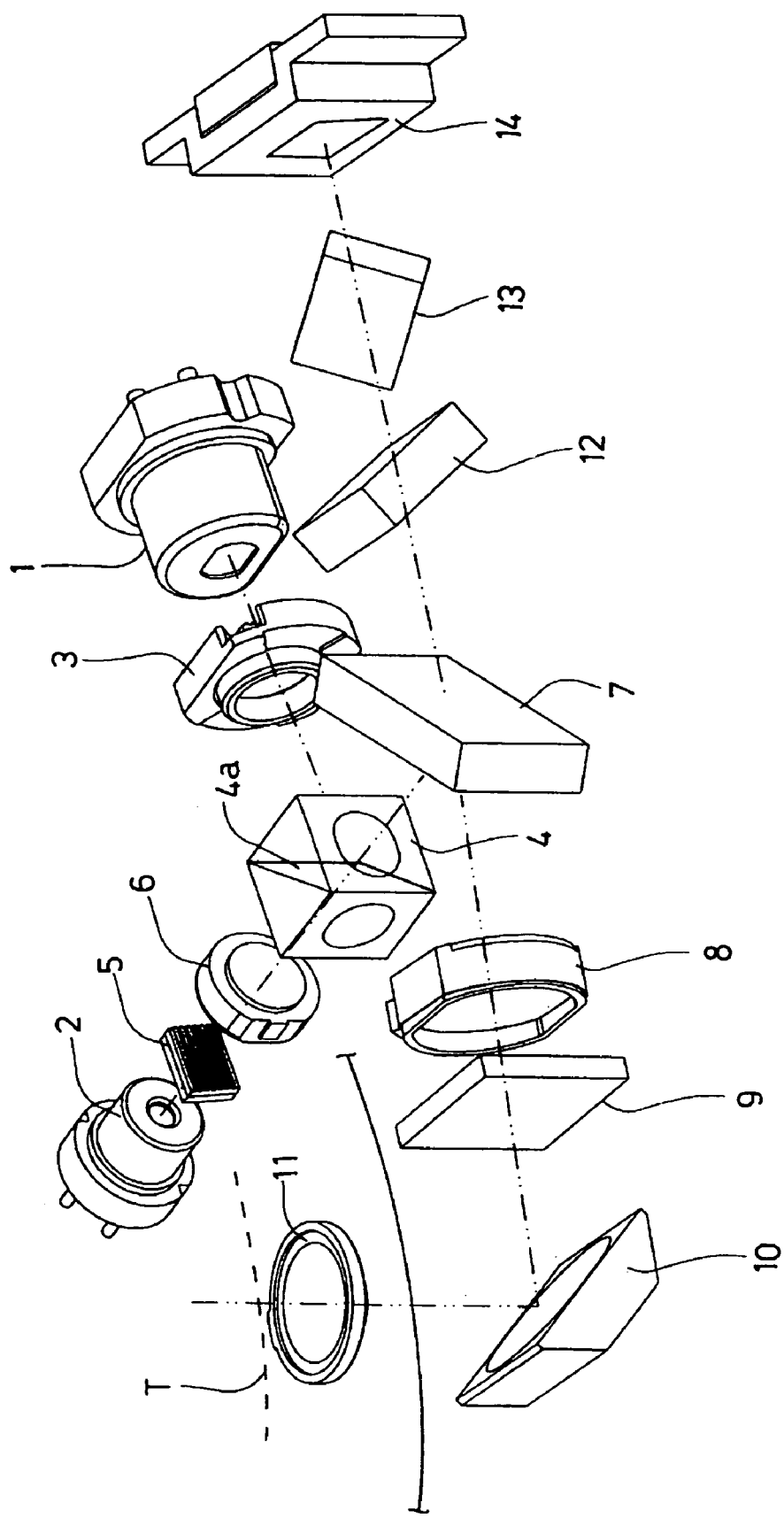
FIG. 1 illustrates an optical arrangement of an exemplary optical system of an optical pickup device according to the present invention.

FIG. 1 is an optical arrangement diagram illustrating, by way of example, an optical system of an optical pickup device according to the present invention.

The optical pickup device illustrated in FIG. 1 is compatible with CD and DVD recording and playback.

A reference numeral 1 designates a first semiconductor laser adapted to emit, for example, a laser beam of 658 nm in wavelength in the 650-665 nm range, the range suited to DVD recording and playback, whereas a reference numeral 2 a second semiconductor laser adapted to emit, for example, a laser beam of 784 nm in wavelength in the 775-795 nm range, the range suited to CD recording and playback.

Each of the first and second semiconductor lasers 1 and 2 incorporates a laser diode and a laser beam source in the respective package.

A laser beam emitted from the first semiconductor laser 1 is first split into a zero-order diffracted light beam and positive and negative first-order diffracted light beams via a diffraction grating 3 having an effective diffractive action on the wavelength of this laser beam and then strikes a prism beam splitter 4.

On the other hand, a laser beam emitted from the second semiconductor laser 2 is first split into a zero-order diffracted light beam and positive and negative first-order diffracted light beams via a diffraction grating 5 having an effective diffractive action on the wavelength of this laser beam, adjusted in divergence angle by a coupling lens 6 and then strikes the prism beam splitter 4.

Here, the beam splitter 4 has a splitting surface 4a formed with a polarizing filter. The diffraction gratings 3 and 5 each have a surface, different from a diffraction surface, that is given a 1/2 wavelength plate function. The 1/2 wavelength plate function of the diffraction gratings 3 and 5 ensures that the laser beam emitted from the first semiconductor laser 1 points in the direction of polarization reflected from the polarizing filter of the splitting surface 4a of the beam splitter 4 and that the laser beam emitted from the second semiconductor laser 2 points in the direction of polarization transmitting through the polarizing filter of the splitting surface 4a of the beam splitter 4.

It is to be noted that the polarization directions of the laser beams emitted respectively from the first and second semiconductor lasers 1 and 2 are determined by the orientations of the junction surfaces of the laser diodes that are respectively the laser beam sources of the first and second semiconductor lasers 1 and 2. Therefore, it may be chosen not to impart the 1/2 wavelength plate function to the diffraction gratings 3 and 5 if the junction surface of the laser diode in the first semiconductor laser 1 is oriented such that the laser beam emitted from the first semiconductor laser 1 is reflected by the polarizing filter of the splitting surface 4a of the beam splitter 4, and also if the junction surface of the laser diode in the second semiconductor laser 2 is oriented such that the laser beam emitted from the second semiconductor laser 2 transmits through the polarizing filter of the splitting surface 4a.

The laser beam emitted from the first semiconductor laser 1 and incident upon the beam splitter 4 is reflected by the splitting surface 4a of the beam splitter 4. This causes the optical axis to be bent. Further, the beam is reflected by the surface of a half-mirror 7 that is a plane-parallel plate beam splitter and formed into a parallel beam by a collimator lens 8, followed by the transformation into a circular polarization by a 1/4 wavelength plate 9. Then, the optical axis of the laser beam incident upon a reflect mirror 10 is raised by the reflect mirror 10, after which the beam strikes an objective lens 11.

The objective lens 11 is configured with a bifocal lens compatible with the laser wavelengths of both DVD and CD. The lens is designed with the NA (Numerical Aperture) of 0.65 for the wavelength compatible with DVDs and 0.51 for the wavelength compatible with CDs. When the laser beam from the first semiconductor laser 1 compatible with DVDS strikes the objective lens 11, this beam is properly focused to the DVD substrate thickness and irradiated onto the DVD signal surface.

On the other hand, the laser beam emitted from the second semiconductor laser 2 and incident upon the beam splitter 4 transmits through the splitting surface 4a of the beam splitter 4 and travels through the same optical path as the laser beam from the first semiconductor laser 1. The beam is reflected by the surface of the half-mirror 7 and formed into a parallel beam by the collimator lens 8, followed by the transformation into a circular polarization by the 1/4 wavelength plate 9. Then, the optical axis of the laser beam is raised by the reflect mirror 10, after which the beam strikes the objective lens 11. The beam is properly focused to the CD substrate thickness and irradiated onto the CD signal surface.

The laser beams modulated and reflected by the DVD and CD signal surfaces return respectively to the objective lens 11 and eventually to the half-mirror 7 via the reflect mirror 10, the 1/4 wavelength plate 9 and the collimator lens 8.

The laser beams returned to the half-mirror 7 transmit through the half-mirror 7 first and then a first plane-parallel plate 12 that is tilted in the direction rotated π/2 (rad) around the optical axis relative to the half-mirror 7. The beam is further guided to a photodetector 14 via a second plane-parallel plate 13.

Figure 2:
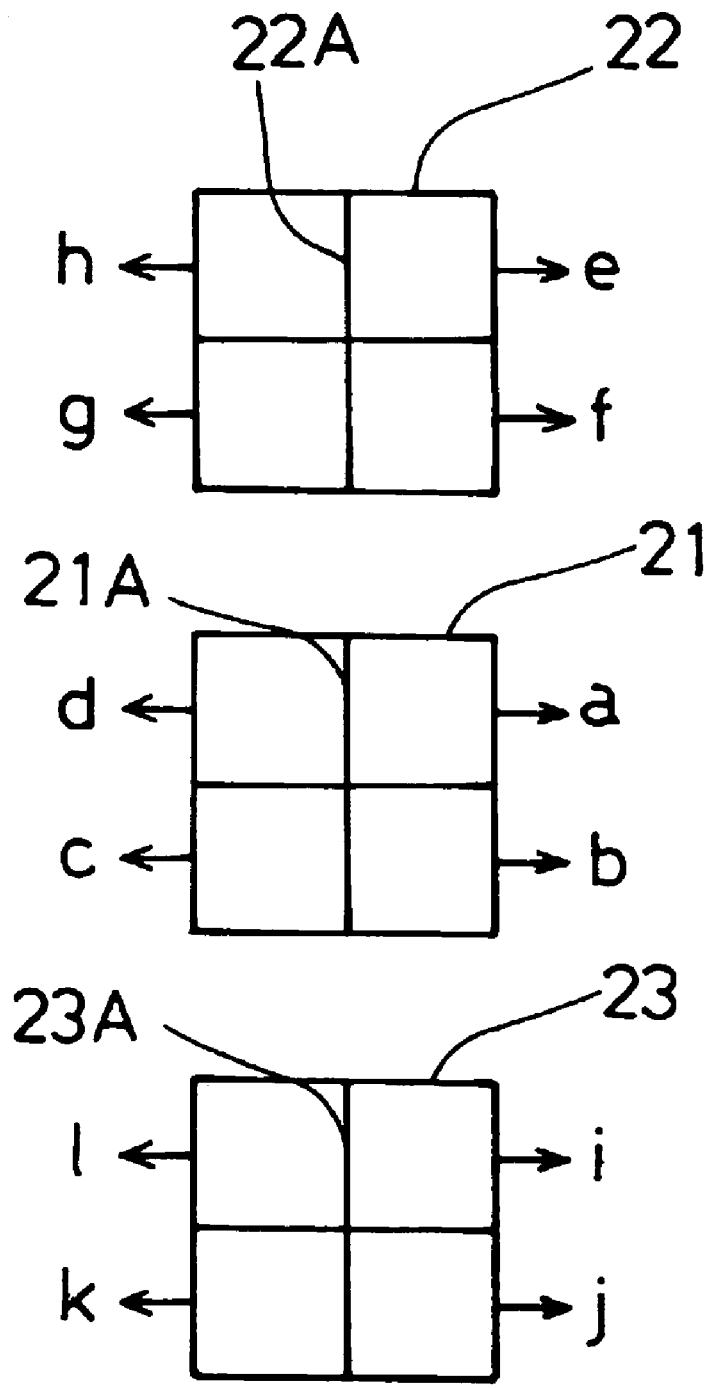
FIG. 2 is an explanatory view illustrating the tracking control and focus control systems.

The photodetector 14 employs a DVD light receiving unit applicable to DVD recording/playback and a CD light receiving unit applicable to CD recording/playback. As illustrated in FIG. 2, the main light receiving region 21 and the sub-light receiving regions 22 and 23 are each made up of four segments as a result of cross-shaped division into four parts by two dividing lines that intersect each other at right angle. Using the light reception outputs from the individual segments making up the main light receiving region 21 and the sub-light receiving regions 22 and 23, the photodetector 14 calculates tracking and focus error signals compatible with the tracking and focus control systems appropriate for each of various types of recordable/playable disks, as described in FIG. 2.

Incidentally, the optical pickup device illustrated in FIG. 1 employs the phase difference method for tracking control of DVD-ROMs and the differential push-pull method for DVDs±R/RW and CDs in general. Therefore, one of the dividing lines or the dividing lines 21A, 22A and 23A of the light receiving regions of the photodetector 14 (main- and sub-light receiving regions) are provided in the direction of signal tracks T of the disk.

That is, the signal tracks T are parallel with the optical axis of the laser beam traveling from the reflection surface of the half-mirror 7 to the reflect mirror 10. On the other hand, projected signal tracks, resulting from the projection of the signal tracks T on the light receiving regions of the photodetector 14, are parallel with one of the dividing lines or the dividing lines 21A, 22A and 23A.

For this reason, astigmatism occurring during transmission of the laser beam through the half-mirror 7 is not in the direction applicable to the astigmatism method for focus control. In addition, this astigmatism is nothing but harmful. Therefore, this astigmatism is canceled by the first plane-parallel plate 12.

Figure 3A:
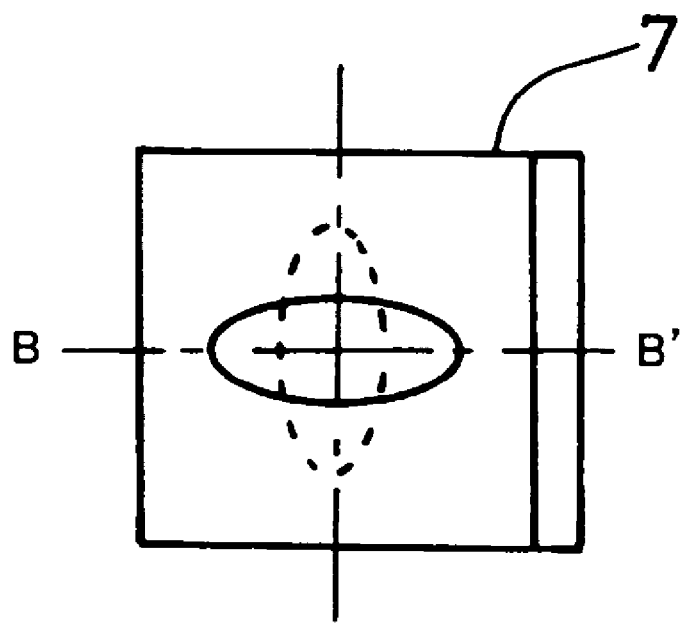
FIGS. 3A to 3C are explanatory views illustrating how astigmatism occurs.
Figure 3B:
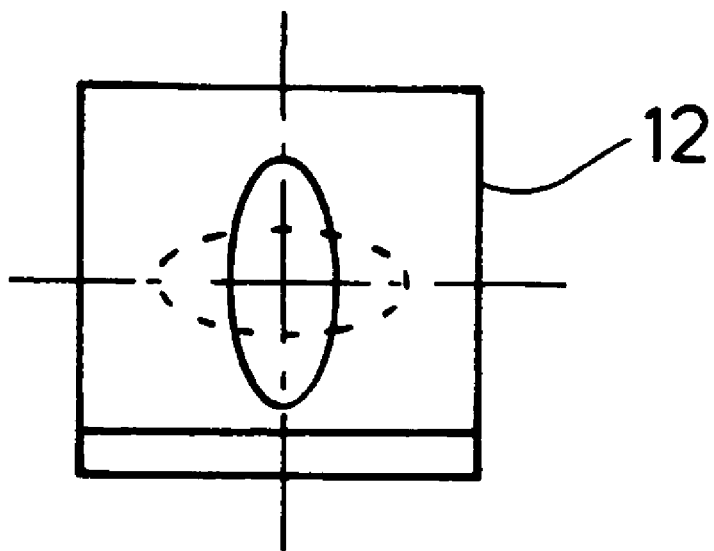
Figure 3C:
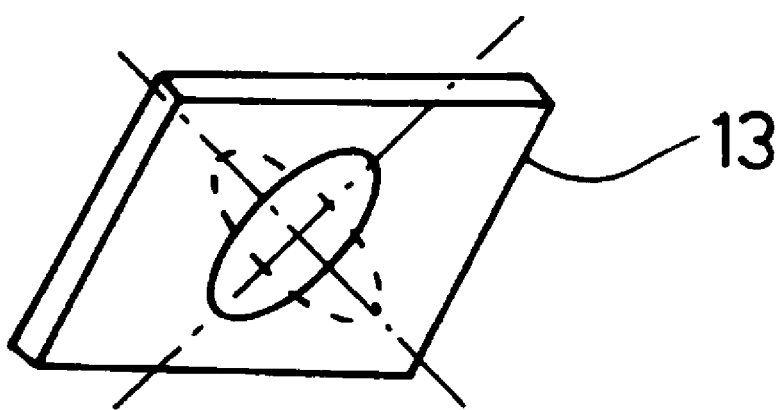

The first plane-parallel plate 12 is tilted in the direction rotated π2 (rad) around the optical axis relative to the half-mirror 7. Astigmatism is generated in the focal line directions of the half-mirror 7 and the first plane-parallel plate 12 and in the directions orthogonal to the focal lines. Therefore, assuming that the focal line direction of the half-mirror 7 is B-B', the astigmatism generated by the half-mirror 7 is as illustrated in FIG. 3A. On the other hand, the astigmatism generated by the first plane-parallel plate 12 is as illustrated in FIG. 3B. The astigmatisms generated respectively by the half-mirror 7 and the first plane-parallel plate 12 are identical in direction but opposite in phase with respect to each other.

Magnitude of astigmatism is generated in response to the material, thickness and tilt angle. Therefore, the first plane-parallel plate 12 is designed in consideration of these requirements to generate the same magnitude of astigmatism as the half-mirror 7. In the present embodiment, the half-mirror 7 and the first plane-parallel plate 12 are made of glass plates of the same material, and equal in thickness and tilt angle.

This ensures that the astigmatism generated by the half-mirror 7 is canceled by the first plane-parallel plate 12.

On the other hand, the second plane-parallel plate 13 is tilted in the direction rotated π/4 (rad) around the optical axis relative to the respective tilt directions of the half-mirror 7 and the first plane-parallel plate 12. The second plane-parallel plate 13 is oriented so as to generate astigmatism in the direction having an angle of π/4 (rad) relative to each of the dividing lines of the light receiving regions of the photodetector 14 (main and sub-light receiving regions). This allows the focus control to be applied to various DVDs based on the differential astigmatism method and to various CDs based on the astigmatism method using astigmatism generated by the second plane-parallel plate 13.

Figure 4A:
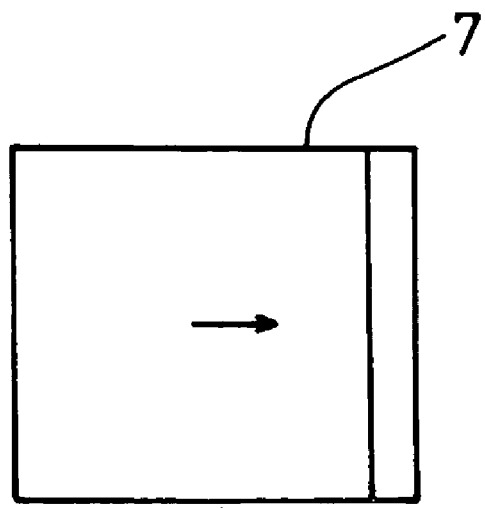
FIGS. 4A to 4C are explanatory views illustrating how comatic aberration occurs.
Figure 4B:
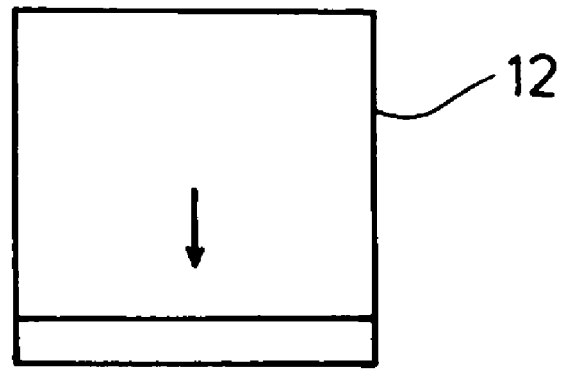

Incidentally, comatic aberration is generated in a laser beam when such a beam transmits through the half-mirror 7 and the first plane-parallel plate 12. The directions of this comatic aberration are represented by the vectors shown by the arrows in FIGS. 4A and 4B.

Figure 4C:
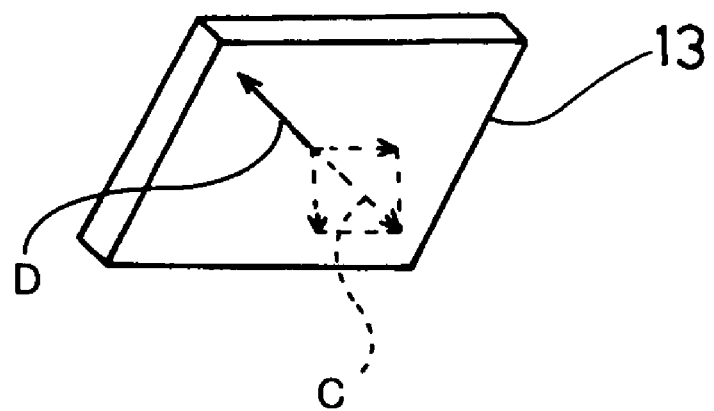

The half-mirror 7 and the first plane-parallel plate 12 are identical in material, thickness and tilt angle. Therefore, the vector of the combined comatic aberration, equal to the sum of the comatic aberrations of the half-mirror 7 and the first plane-parallel plate 12, constitutes a diagonal line of a square having the vectors of the respective comatic aberrations as its sides, as shown by arrow C in FIG. 4C. This diagonal line has an angle of π/4 (rad) relative to each of the vectors of the respective comatic aberrations and the magnitude of the combined comatic aberration corresponds to the diagonal line.

The second plane-parallel plate 13 is tilted in the direction rotated π/4 (rad) around the optical axis relative to the respective tilt directions of the half-mirror 7 and the first plane-parallel plate 12. The vector of the comatic aberration generated by the second plane-parallel plate 13 is opposite in direction to the vector of the combined comatic aberration generated by the half-mirror 7 and the first plane-parallel plate 12. The magnitude of the comatic aberration generated by the second plane-parallel plate 13 is set to be equal to the magnitude of the combined comatic aberration based on the material, thickness and tilt angle.. The second plane-parallel plate 13 is given a comatic aberration correction function based on the vector shown by arrow D that is opposite in direction to the combined comatic aberration but equal in magnitude. As a result, the second plane-parallel plate 13 carries out the comatic aberration correction so as to cancel the combined comatic aberration. This allows a light spot, free of the combined comatic aberration as a result of cancellation, to be projected on the main and sub-light receiving regions of the photodetector 14.

It is to be noted that when the half-mirror 7 is used as a plane-parallel plate beam splitter as in the embodiment, part of the laser beams from the first and second semiconductor lasers 1 and 2 can be allowed to leak in the direction of transmission through the half-mirror 7 rather than in the direction of the objective lens 11. If a front monitor diode is provided in the direction of laser beam leakage, the laser beam from the first or second semiconductor laser 1 or 2 can be detected by the front monitor diode so as to control the light intensity of the laser beam to a given intensity.

On the other hand, if the polarization directions of the laser beams, emitted respectively from the first and second semiconductor lasers 1 and 2, are allowed to coincide with each other, a polarization beam splitter having a polarizing filter as the reflection surface can be used as a plane-parallel plate beam splitter rather than the half-mirror 7.

Although the preferred embodiment of the present invention has been described in detail, the above embodiment is provided to facilitate the understanding of the present invention and not intended to limit the present invention. It should be understood that various changes and alterations can be made therein without departing from spirit and scope of the invention and that the present invention includes its equivalents.

What is claimed is:

1. An optical pickup device comprising:
   a plane-parallel plate beam splitter that reflects a laser beam emitted from a laser beam source;
   an objective lens that focuses the laser beam from the plane-parallel plate beam splitter so as to irradiate the focused beam into a signal recording medium;
   a photodetector that receives the laser beam reflected and returned from the signal recording medium through the beam splitter, the photodetector having light receiving regions each of which is divided at least into four parts by two dividing lines that intersect each other at right angle;
   a first plane-parallel plate disposed between the beam splitter and the photodetector, the first plane-parallel plate being tilted in a direction rotated π/2 radians around an optical axis with respect to the beam splitter; and
   a second plane-parallel plate disposed between the beam splitter and the photodetector, the second plane-parallel plate being tilted in a direction of rotation around the optical axis such that a direction of astigmatism projected on the light receiving regions of the photodetector has an angle of π/4 radians relative to each of the dividing lines, wherein astigmatism generated by the beam splitter is canceled by the first plane-parallel plate, and wherein astigmatism used for focus control is generated by the second plane-parallel plate.

2. The optical pickup device of claim 1, wherein the second plane-parallel plate is tilted in the direction rotated π/4 radians around the optical axis relative to the respective tilt directions of the beam splitter and the first plane-parallel plate, and wherein the tilt direction of the second plane-parallel plate is set so as to correct combined comatic aberration generated by the beam splitter and the first plane-parallel plate.

3. The optical pickup device of claim 1, wherein a reflect mirror is disposed before the objective lens in the optical path leading to the signal recording medium, wherein the laser beam source is disposed on the reflection surface side of the beam splitter, wherein the photodetector is disposed on the transmission surface side of the beam splitter, and wherein one of the dividing lines in the light receiving regions of the photodetector is set in the direction of signal tracks of the signal recording medium.

* * * * *